United States Patent [19]
Yu

[11] Patent Number: 5,183,177
[45] Date of Patent: Feb. 2, 1993

[54] STORAGE BOX FOR ASSORTMENT OF ARTICLES

[76] Inventor: Jackson Yu, 2F, No. 2, Chung-Hua St., Peitou Dist., Taipei City, Taiwan

[21] Appl. No.: 890,624

[22] Filed: May 28, 1992

[51] Int. Cl.$^5$ .................... B65D 85/57; B65D 85/575
[52] U.S. Cl. .................... 220/523; 206/309; 206/387; 220/351; 312/9.21
[58] Field of Search ............ 206/309, 387, 444; 220/345, 350, 4.28, 523; 312/9.2, 9.21-9.25

[56] References Cited

U.S. PATENT DOCUMENTS

| | | | |
|---|---|---|---|
| 2,555,705 | 6/1951 | Schafer | 220/350 |
| 3,150,791 | 9/1964 | Shile | 220/350 |
| 4,162,024 | 7/1979 | Shanley | 220/350 |
| 4,465,187 | 8/1984 | Kinard et al. | 220/350 |
| 4,580,679 | 4/1986 | Hellman, III | 220/350 |
| 4,815,795 | 3/1989 | Accumanno | 206/387 |
| 4,819,802 | 4/1989 | Gutierrez | 206/387 |
| 4,846,355 | 7/1989 | Price, Sr. et al. | 206/387 |

FOREIGN PATENT DOCUMENTS 2021072 11/1979 United Kingdom ............... 206/387

Primary Examiner—Jimmy G. Foster
Attorney, Agent, or Firm—Marshall & Melhorn

[57] ABSTRACT

A storage box includes a rigid enclosing housing having a front opening and two separate left and right plates positioned against the left and right walls of the housing. The left and right plates are provided with vertically spaced and horizontally aligned racks. A sliding door is slideably held in the guide rails provided in the left and right plates which extend adjacent to the top and rear walls of the housing and which permit the door to be drawn to the front side of the housing to cover the front opening.

10 Claims, 4 Drawing Sheets

STORAGE BOX FOR ASSORTMENT OF ARTICLES

BACKGROUND OF THE INVENTION

1. Field of the Invention

The present invention relates to a storage box for assortment of articles such as audio cassettes and compact discs (CD). The storage box of the present invention is easy to assemble during the manufacturing process, has a flexible sliding door provided within the housing of the storage box to prevent the accumulation of dust on the flexible sliding door, and is able to bear more weighty objects.

2. Description of the Related Art

The conventional cassette storage device for audiocassettes and CDs cassettes is generally sold as an integral which is formed by complicated manufacturing process and often without a door design so that dust or dirt may easily deposit thereupon. Therefore, after being exposed to the atmosphere for a long time, a layer of dust often collect on the stored tapes or CDs.

There is another type of cassette storage device which is provided with a plate for use as a door. Such can prevent the stored objects from accumulating dust. However, it needs extra space for pulling the door open. This makes it inconvenient to use.

A cassette storage device having a slidable door has been designed recently. As can be seen in FIG. 1, the slidable door is a collapsible flexible sliding door (B) which is formed by attaching several unit plates (A) to a fabric sheet with each sheet parallel to the other. The flexible sliding door (B) is then fitted into the guiding grooves (C1) of the storage device (C) and can slide therethrough. The flexible sliding door (B) covers the upper and the front side of the lateral faces of the storage device (C). It can protect the stored cassettes from dust and does not occupy extra space when operating the flexible sliding door.

Because the upper face of the above described storage device (C) is of a flexible structure, the storage device of the flexible-door type remains defective.

First, the flexible top surface of the door can not support heavier articles, and if someone casually places something heavy upon the top surface of the door and leaves it there for a long time out of carelessness, it may cause deformation of and even damage to the door. As a result, the door will no longer be easy to slide along the guiding grooves.

Second, the clearance between every two unit pieces of sheets of the door easily collects dust and is difficult to clean.

Third, since the sliding door is installed directly on the walls of the cabinet of the storage device (C), the assembly of the device (C) is inconvenient.

Other known storage boxes are disclosed in U.S. Pat. Nos. 4,815,795, 2,221,024, 2,233,938, 2,781,125, 3,897,871, 4,359,162, 4,544,213, 4,677,535, 4,627,535, 4,629,067, 3,608,741, 3,954,184, 4,411,481, 4,759,449, 4,768,661, and 4,7B2,949, Australia Patent No. 24278 and Japanese Patent No. 175182.

SUMMARY OF THE INVENTION

To resolve the aforementioned problems, one object of the present invention is to provide a storage box for assortment of articles such as audio cassettes or CDs which can be easily assembled.

Another object of the present invention is to provide a storage box for assortment of articles such as audio cassettes or CDs which has a strong and durable construction.

A further object of the present invention is to provide a storage box for assortment of articles such as audio cassettes or CDs which can prevent the stored cassettes or other articles and the flexible sliding door from accumulating dust and which is easy to clean.

Accordingly, the storage box for assortment of articles comprises a housing having a top wall, a bottom wall, a right side wall and a left side wall; a pair of left and right separate plates respectively positioned against said left and right side walls, each of said left and right plates having a top side, a rear side, a front side and a guide rail extending along said rear side, said top side and said front side; a top plate disposed between and spacing said left and right plates adjacent to said top sides thereof; a flexible sliding door placed between said left and right plates and having two opposite ends slidably extending into said guide rails of said left and right plates, said sliding door being drawable over said top plate when sliding in said guide rails; and said left and right plates further having inwardly projecting racks spaced vertically, each rack of said left plate aligned horizontally with the corresponding one of said right plate.

BRIEF DESCRIPTION OF THE DRAWINGS

These aforementioned objects and other aspects, features and advantages of the storage box of the present invention will become apparent from the following detailed description of the preferred embodiment of the present invention with the accompanying drawings.

DETAILED DESCRIPTION OF THE PREFERRED EMBODIMENT

Figure 1:
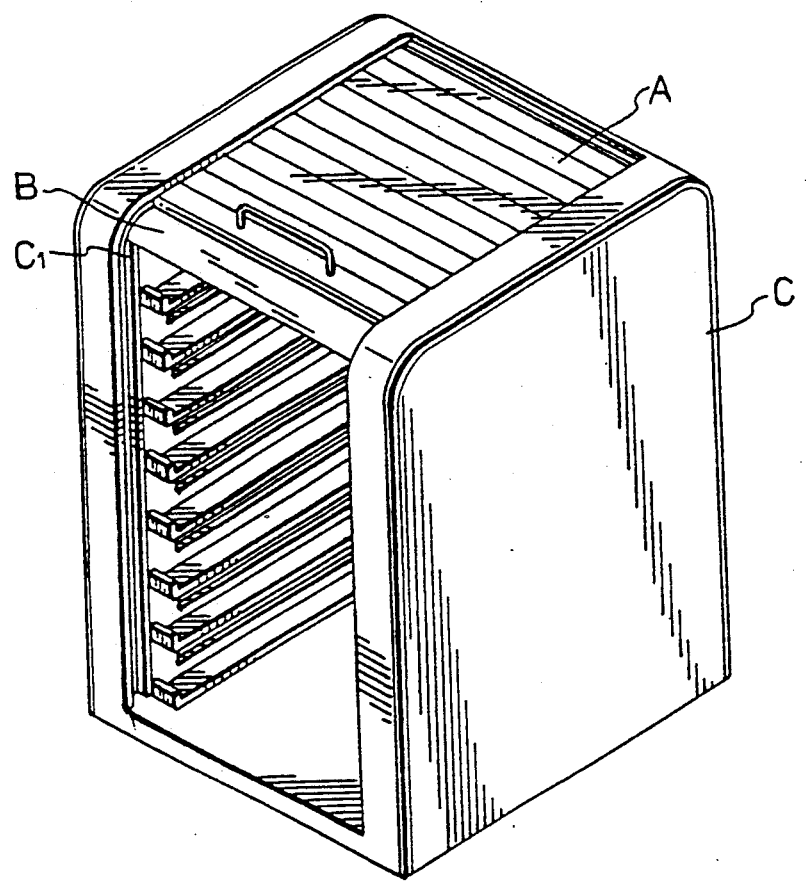
FIG. 1 illustrates a perspective view of a cassette storage device of the prior art.
Figure 2:
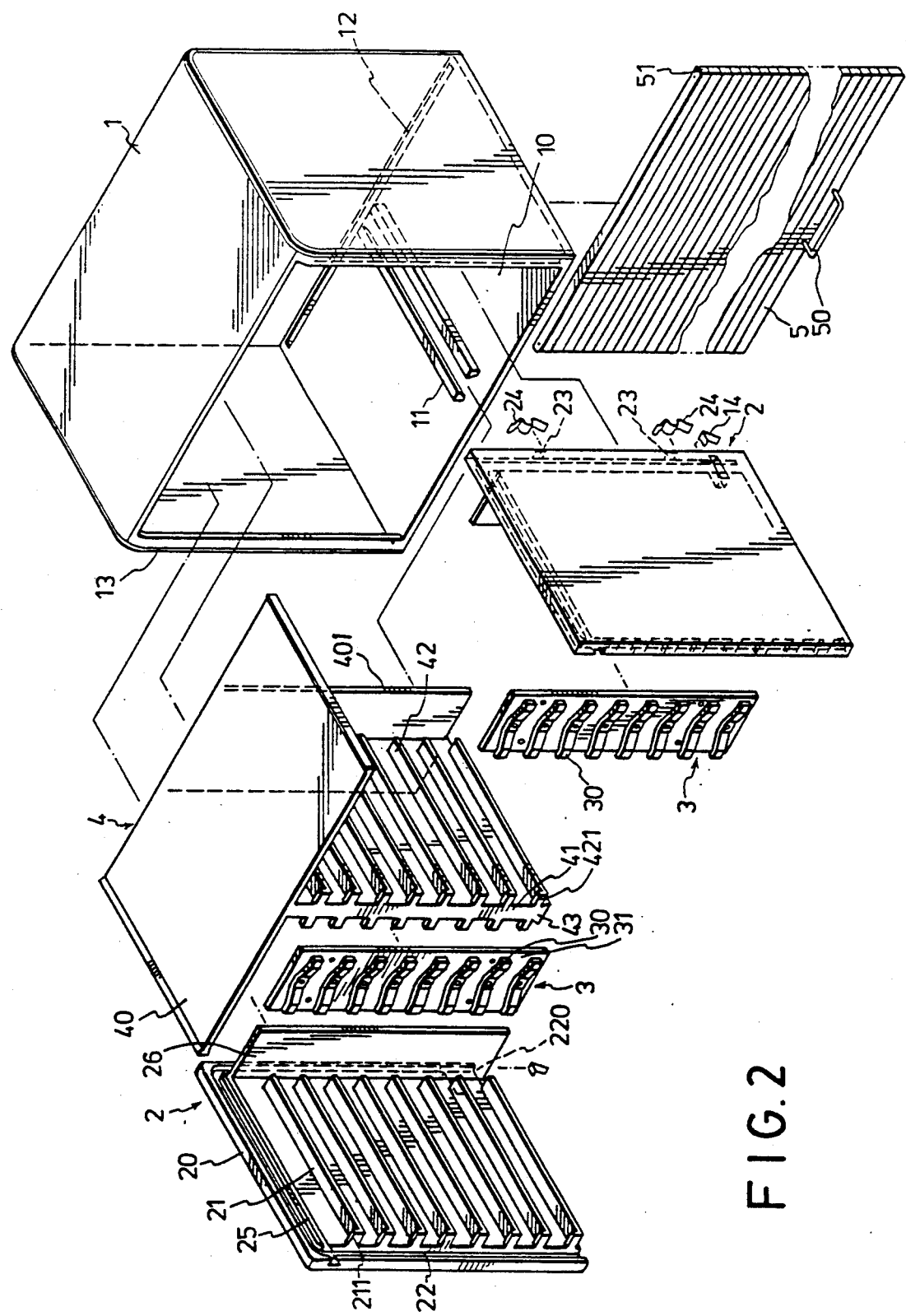
FIG. 2 illustrates an exploded perspective view of a preferred embodiment of a storage box in accordance with the present invention.

Referring now to FIG. 2, the preferred embodiment of a storage box according to the present invention includes a housing (1), a pair of left and right separate plates (2), two spring boards (3), a top plate (4), and a flexible sliding door (5). According to the preferred embodiment of the present invention, the housing (1) has a top wall, a bottom wall, a right side wall, a left side wall and a rear wall, all of which connected together to form a front opening (10). The housing (1) preferrably has two opposite front flanges (13) projecting from the left and right side walls at the front opening (10). The bottom wall has a positioning groove (11) and an elongated access slot (12).

Each of said pair of left and right plates (2) has a guide rail (22) extending along the rear side, the top side and the front side thereof. Said guide rail (22) has a rear end (220) adjacent to the bottom wall of the housing (1). Said elongated access slot (12) of the bottom wall is aligned with the rear end (220) of the guide rail (22) of each of the left and right plates (2). The left and right plates (2) further have inwardly projecting racks (21) which are spaced vertically, and each rack (21) of the left plate is aligned horizontally with the corresponding one of the right plate. Each of the left and right plates (2) is further provided with a horizontal groove (25) above the racks (21) and below the guide rail (22). Also, each of the left and right plates (2) is provided with positioning spring members (24) and the corresponding receivers (23) at the rear side thereof.

A top plate (41) is then detachably connected to the left and right plates (2) by engaging the horizontal grooves (25) and is disposed therebetween. Said top plate (41) has a vertical partition plate (41) parallel to the left and right side walls of the housing (1) and extending downward therefrom. Said vertical partition plate (41) has two opposite faces opposing the left and right plates (2) respectively; the opposite faces have racks (42) which are spaced vertically and which are aligned horizontally with the racks (21) of the left and right plates (2). Furthermore, the bottom side of the vertical partition plate (41) has a dovetail (43) which engages in the positioning groove (11).

Each of the left and right plates (2) is further provided with a rear plate-like flange (26) perpendicularly projecting from between the racks (21) and the rear side portion of the guide rail (22), and the top plate (41) is further provided with a back panel (40). Said back panel (401) projects laterally from the rear side of the vertically partition plate (41) and is perpendicular to the top plate (41).

Two spring boards (3) are then mounted between the rear plate-like flanges (26) and the back panel (401). One spring board (3) is fixed to the rear plate-like flange (26) of said left plate (2) and said vertical partition plate (41), and the other is fixed to the rear plate-like flange (26) of said right plate (2) and said vertical partition plate (41). Each spring board (3) has a plurality of vertically spaced spring members (30) which are substantially horizontally with the racks (21 and 42) (FIG. 5).

Figure 4:
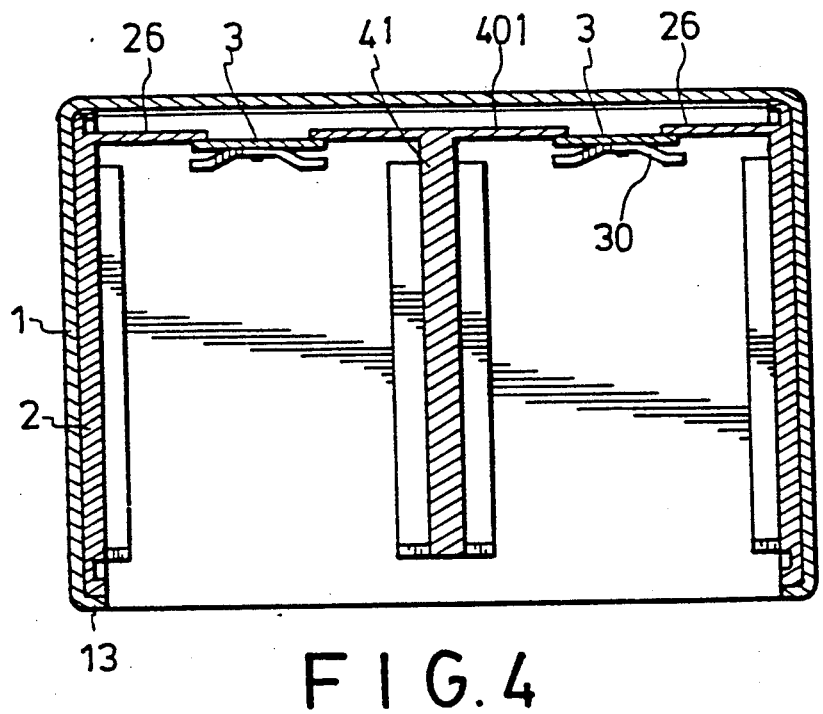
FIG. 4 illustrates a sectional view taken along line 4—4 of FIG. 3.

In assembly, the left and right plates (2) are respectively pressed against the left and right side walls of the housing (1), and the top plate (41) and the vertical partition plate (41) are inserted into the housing (1) by sliding them along the grooves (25) of the left and right plates (2) and the positioning groove (11) of the housing (1). Since the spring members (24) of the plates (2) bear against the rear wall of the housing (1) and bias (urge) the plates (2) against the front flanges (13), the plates (2) are firmly press fitted in between the rear wall of the housing (1) and the front flanges (13). Afterwards, the spring boards (3) are screwed to the rear plate-like flanges (26) and the back panel (401), as best shown in FIGS. 4. The partition plate (41) divides the housing (1) into two accommodating spaces, in each of which each pair of the aligned racks (21 and 41) can cooperatively hold a disc or the like. It can be noted that the spring boards (3), the rear plate-like flanges (26), and the back panel (401) cooperate with the top and rear walls of the housing (1) to confine an enclosed space to receive the sliding door (5).

Figure 3:
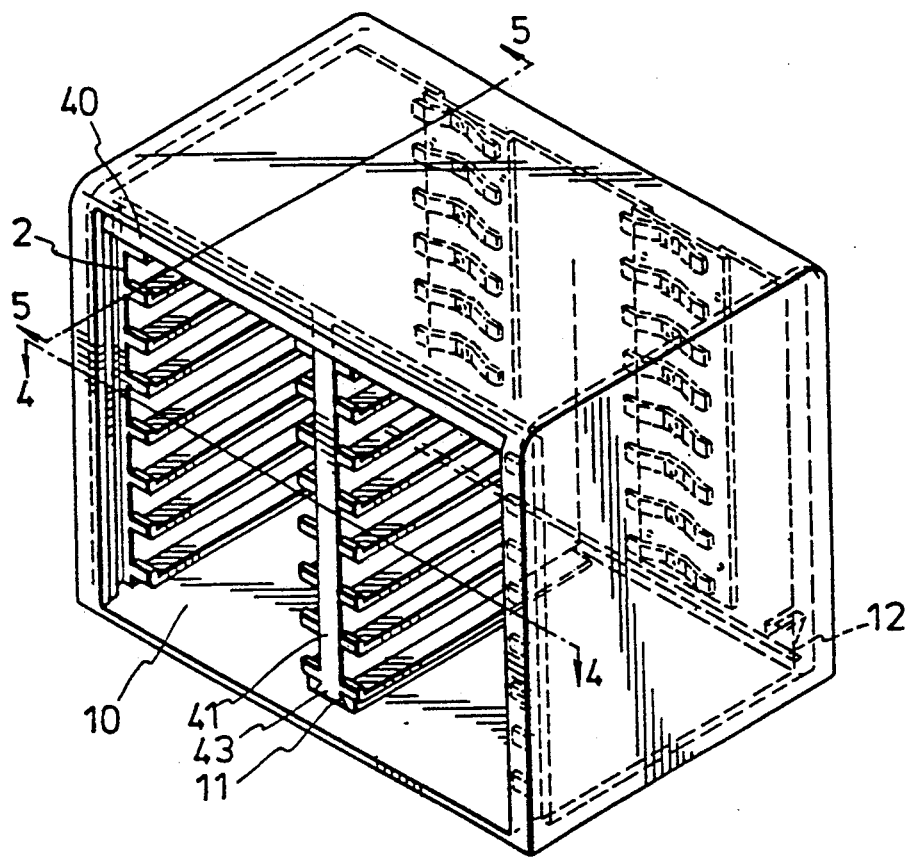
FIG. 3 illustrates the perspective view of the storage box of FIG. 2 after assembly.
Figures 3A, 3B:
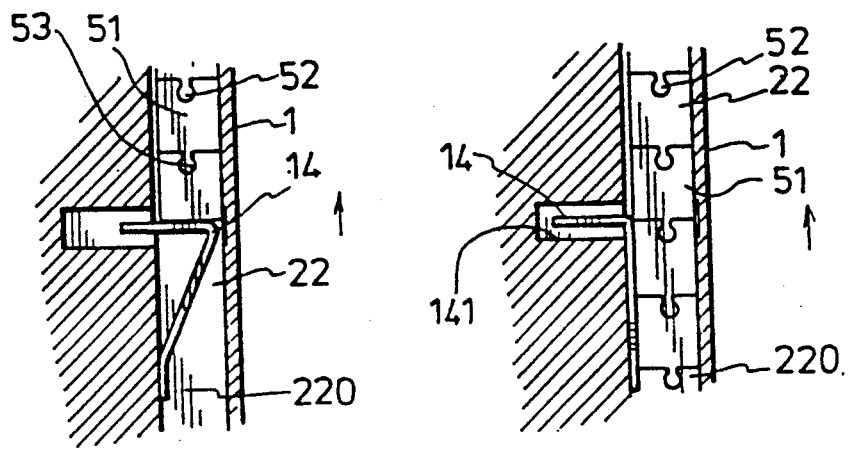
FIG. 3A illustrates a fragmental side section view of a rear lower portion of the storage box of FIG. 2 to show the insertion of the flexible sliding door (5).
FIG. 3B illustrates an alternative fragmental side section view of a rear lower portion of the storage box of FIG. 2 to show the resilient stop means (14) which springs out after the insertion of the flexible sliding door (5).
Figure 5:
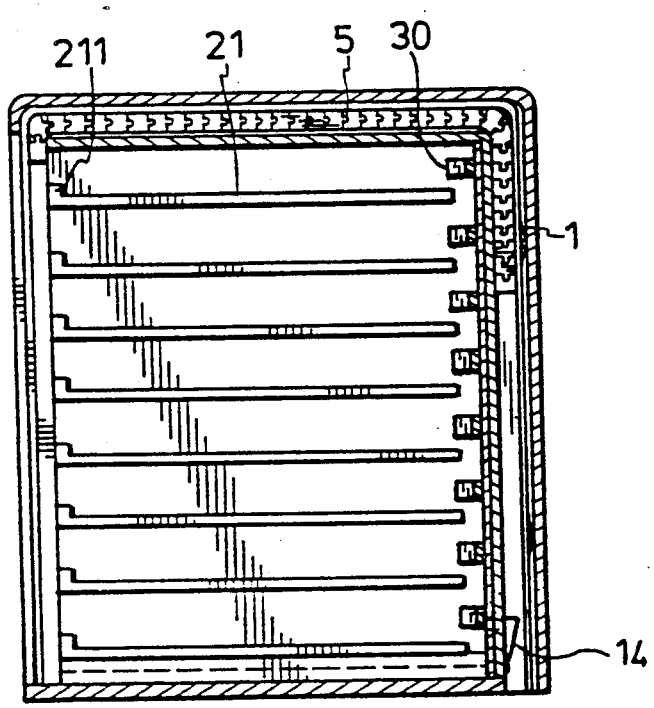
FIG. 5 illustrates a side elevation taken along line 5—5 of FIG. 3.

Referring to FIGS. 3A, 3B and 5, the sliding door (5) includes a plurality of elongated parallel rods (51) of rectangular cross-sections and a joining means including interengageable rounded grooves (53) and rounded projections (52) to interconnect the parallel rods (51) successively and turnably. The flexible sliding door (5) is pushed into the housing (1) through the access slot (12) of the bottom wall of the housing (1). The sliding door (5) automatically engages the guide rails (22) of the plates (2) and slides therealong until the rear end thereof reaches a position inward of the resilient stop members (14). The resilient stop members (14) retract in the holes (141) of the plates (2) when they are pressed by the resilient stop members (14) and project into the guide rails (22) to stop the downward movement of the the sliding door (5) after the sliding door (5) is entirely inserted into the housing. The forwarding end of the sliding door (5) is preferrably provided with a handle (50) (FIG. 2).

As best shown in FIG. 5, the racks (21 and 42) are provided with front projections (211 and 421). When a disc is to be placed on a pair of racks (21 and 42), the disc must be pushed toward a corresponding spring member (30) and then downward so that the spring member (30) is depressed and the disc is held firmly on the racks (21 and 42) by the action of the spring member (30) which urges the disc against the front projections (211 and 421).

The storage box of this invention provides the following advantages:

1. The storage box has a strong and durable construction since the housing (1) has rigid walls which can bear weighty objects and since the sliding door (5) is constituted by rods rather than sheets or plates; and 2. The sliding door is exposed only at the front side of the housing (1) and can be enclosed in a a narrow space confined by the top and rear walls of the housing, the top plate (4), the rear plate-like flanges (26), the spring boards (3) and the back panel (401). This arrangement minimizes the problem of dusting the sliding door and facilitates the cleaning of the entire storage box.

In a second embodiment of the present invention, the storage box is not provided with the vertical partition plate (41) of the previous embodiment. In addition, only one spring board (3) is employed therein. This box has a reduced size. It is to be noted that these and other modifications are apparant to those skilled in the art without departing from the scope of the invention.

I claim:

1. A storage box for assortment of articles comprising:

a housing having a top wall, a bottom wall, a right side wall and a left side wall;

a pair of left and right separate plates respectively positioned against said left and right side walls, each of said left and right plates having a top side, a rear side, a front side and a guide rail extending along said rear side, said top side and said front side;

a top plate disposed between and spacing said left and right plates adjacent to said top sides thereof;

a flexible sliding door placed between said left and right plates and having two opposite ends slidably extending into said guide rails of said left and right plates, said sliding door being drawable over said top plate when sliding in said guide rails; and said left and right plates further having inwardly projecting racks spaced vertically, each rack of said left plate aligned horizontally with the corresponding one of said right plate.

2. A storage box for assortment of articles comprising:
a housing having a top wall, a bottom wall, a right side wall, a left side wall and a rear wall;
a pair of left and right separate plates respectively positioned against said left and right side walls, each of said left and right plates having a top side, a rear side, a front side and a guide rail extending along said rear side, said top side and said front side, said guide rail having a rear end adjacent to said bottom wall of said housing, said left and right plates further having inwardly projecting racks spaced vertically, each rack of said left plate aligned horizontally with the corresponding one of said right plate;
said bottom wall of said housing having an elongated access slot aligned with said rear end of said guide rail of each of said left and right plates;
a flexible sliding door placed between said left and right plates via the passage through said elongated access slot and having two opposite ends slidably extending into said guide rails of said left and right plates;
a resilient stop means provided in said rear end of said guide rail to prevent said sliding door from being released from said guide rail;
each of said left and right plates further having a horizontal groove above said racks and below said guide rail; and
a top plate disposed between said left and right plates and engaging said horizontal grooves.

3. A storage box as claimed in claim 2, wherein said housing further has two opposite front flanges projecting from said left and right side wall in front of said front sides of said left and right plates.

4. A storage box as claimed in claim 3, wherein each of said left and right plates have position spring members at said rear side thereof, said positioning spring members bearing against said rear wall and urging said each of said left and right plates against said front flanges.

5. A storage box as claimed in claim 2, wherein said bottom wall has a positioning groove parallel with said left and right side walls, said top plate having a vertical partition plate parallel to said left and right side walls and extending downward therefrom to engage in said positioning groove.

6. A storage box as claimed in claim 5, wherein said vertical partition plate has two opposite faces opposing said left and right plates respectively, said opposite faces having racks which are spaced vertically and which are aligned horizontally with said racks of said left and right plates.

7. A storage box as claimed in claim 6, wherein said vertical partition plate has an integral vertical back panel overlying and spaced from said rear wall of said housing.

8. A storage box as claimed in claim 7, wherein said left and right plates have rear plate-like flanges projecting perpendicularly from said rear sides thereof to overly spacedly from said rear wall of said housing.

9. A storage box as claimed in claim 8, further comprising two spring boards, each of which spacedly overlies said rear wall and each of which is attached to said integral vertical back panel and each of said plate-like flanges, said spring boards having a plurality of vertically spaced spring members which are substantially horizontally aligned with said racks, said spring boards, said plate like flanges, said integral back panel, and said top plate cooperating with said top and rear walls of said housing to protect said sliding door.

10. A storage box as claimed in claim 2, wherein said sliding door includes a plurality of elongated parallel rods of rectangular cross-sections and a joining means including interengageable rounded grooves and projections to connect said parallel rods successively and turnably.

* * * * *